United States Patent [19]

Homan et al.

[11] 4,173,560
[45] Nov. 6, 1979

[54] TREATMENT OF REINFORCING SILICAS WITH AMIDOSILOXANES

[75] Inventors: Gary R. Homan, Midland; Myron T. Maxson, Sanford, both of Mich.; Louis H. Toporcer, Twinsburg, Ohio

[73] Assignee: Dow Corning Corporation, Midland, Mich.

[21] Appl. No.: 904,048

[22] Filed: May 8, 1978

[51] Int. Cl.² ............................................. C08L 83/04
[52] U.S. Cl. ............................. 260/37 SB; 106/308 Q
[58] Field of Search ..................... 260/37 SB, 448.2 N; 106/308 N

[56] References Cited

U.S. PATENT DOCUMENTS

| | | | |
|---|---|---|---|
| 3,243,404 | 3/1966 | Martellock | 260/37 SB |
| 3,488,371 | 1/1970 | Klebe | 260/448.2 N |
| 3,635,743 | 1/1972 | Smith | 106/288 Q |
| 4,008,198 | 2/1977 | Krohberger et al. | 260/37 SB |
| 4,013,611 | 3/1977 | Hechtl et al. | 260/37 SB |
| 4,116,919 | 9/1978 | Elias et al. | 260/37 SB |

*Primary Examiner*—Lewis T. Jacobs
*Attorney, Agent, or Firm*—Roger H. Borrousch

[57] ABSTRACT

Reinforcing silica treated with short chain linear amidosiloxane of the formula

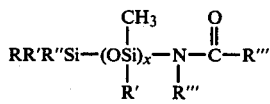

provides a useful reinforcing filler for silicone elastomers. Silicone elastomer bases manufactured using this treated silica can be cured by organic peroxides or the combination of organohydrogensiloxane and platinum catalyst. When the later curing system is used, the cured products exhibit considerable retention of physical properties upon exposure to elevated temperatures for a significant period of time.

31 Claims, No Drawings

TREATMENT OF REINFORCING SILICAS WITH AMIDOSILOXANES

BACKGROUND OF THE INVENTION

1. Field of the Invention

This invention relates to a finely divided silica treated with amidosiloxanes for use in silicone elastomers.

2. Description of the Prior Art

In the silicone elastomer art, the treatment of reinforcing silica fillers is now well known as a means of preventing or retarding the reaction between the surface of the silica filler and the silicone polymer which produces "structuring" or "crepe aging." Structuring results in a subsequent loss of workability of the mixture. U.S. Pat. No. 3,243,404 by Martellock describes silicone compositions containing silylamine or silazane materials as process aids for use in preventing such undesirable reactions. U.S. Pat. No. 3,635,743 by H. Smith describes the use of a process of contacting the filler first with ammonia and then with hexamethyldisilazane. U.S. Pat. No. 4,116,919 by Janet L. Elias, Chi-Long Lee, and Myron T. Maxson, assigned to the same assignee as the present application, discloses the use of reinforcing silica treated with bis-Si(1-methyl-1-silacyclopentenyl)amine and silazane in silicone elastomer compositions.

It has been found that the material used to treat reinforcing silica may have a significant effect upon the properties of the silicone elastomer base produced therefrom and upon the properties of a resulting cured silicone elastomer. The nature of the polydiorganosiloxane fluid used, as well as, the curing mechanism selected both interact with the treated filler to determine the properties of the silicone elastomer base and the cured silicone elastomer. New types of cure systems, as well as, new methods of molding have created a need for novel treatments of reinforcing silica used in the manufacture of silicone elastomers. U.S. Pat. No. 4,008,198 by Krohberger, et al., discloses compositions which are convertible to highly transparent or optically clear elastomers, for example, comprising an organopolysiloxane, a nitrogen containing compound, a hexaorganodisilazane, and silicon dioxide filler.

SUMMARY OF THE INVENTION

Reinforcing silica is treated with an amidosiloxane of the formula

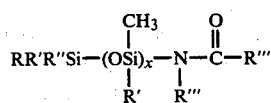

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or vinyl radical; R''' is a methyl or ethyl radical; and x is an integer of from 3 to 20 inclusive. The treated silica is particularly useful in the production of silicone elastomer bases capable of being cured with an organic peroxide vulcanizing agent or alternatively, with an organohydrogen siloxane and a platinum containing catalyst. The treated silica is useful in the production of silicone elastomer bases used in low pressure molding systems. The treated silica used to produce a silicone elastomer base which is subsequently cured with an organohydrogen siloxane and a platinum catalyst gives a cured silicone elastomer with improved heat stability.

DESCRIPTION OF THE INVENTION

This invention relates to a treated silica consisting essentially of a finely divided silica with a surface area of at least 50 square meters per gram, said silica having been mixed with treating agent consisting essentially of an amidosiloxane of the formula

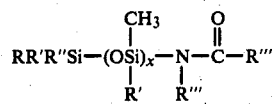

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or vinyl radical; R''' is a methyl or ethyl radical; and x is an integer of from 3 to 20 inclusive.

This invention is based on the discovery that the treated silica described above can be used to reinforce polydiorganosiloxane fluids that are subsequently compounded with crosslinking or vulcanizing agents to yield cured silicone elastomers with desirable physical properties. The use of the above treated silica allows the production of silicone elastomer bases that are low enough in viscosity to make them useful in low pressure molding systems. When the bases are compounded with organohydrogen siloxane and a platinum containing catalyst, the cured compositions maintain their physical properties to a significant degree when subjected to elevated temperatures over a period of time.

Through the use of the treated silica of this invention, it is possible to produce uncured stocks suitable for use in low pressure molding systems for elastomers. These systems require an uncured stock capable of being pumped or pushed by air pressure, 0.6 to 0.7 MPa for example, rather than being forced into the mold by a ram of extrusion screw as used in conventional molding processes for elastomers.

The reinforcing silica used in the preparation of the present invention can be any of the conventional reinforcing silica fillers with a surface area of at least 50 square meters per gram. These reinforcing silica fillers are well known in the art and can be obtained commercially. They are most often produced by burning silanes, for example silicon tetrachloride. The preferred silicas have surface areas from 200 to 400 square meters per gram. The surface of the silica normally contains Si-OH groups as well as Si—O—Si bonds. A certain amount of water may also be absorbed on the surface.

The treating agent of this invention is a short chain linear amidosiloxane of the formula

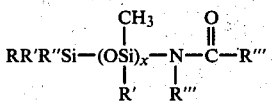

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or vinyl radical; R''' is a methyl or ethyl radical; and x is an integer of from 3 to 20 inclusive. The amidosiloxanes used in this invention are disclosed in an application, Ser. No. 904,177, filed on even date herewith, now U.S. Pat. No. 4,145,359, entitled "Short Chain Linear Amidosiloxanes," by Gary R. Homan and Louis H. Toporcer and assigned to the same assignee as the present invention, which is hereby included by reference to show the amidosiloxanes and a method of manufacturing the amidosiloxanes.

The reinforcing silica is preferably treated by dispersing the silica first in a solvent non-reactive to the treating agent, for instance toluene, and then adding the treating agent. After thorough mixing, which is usually accomplished by stirring for 4 to 24 hours, the mixture is filtered to remove the solvent. The filter cake is the treated silica, excess treating agent, and amide by-product formed by the reaction of the amidosiloxane on the surface of the silica. Any excess treating agent and amide by-product can be removed from the treated silica by washing with a 50-50 mixture by volume isopropanol and water and then drying or by drying alone at a temperature above the boiling point of the amide by-product, approximately 100° C. depending upon the nature of the $R'''$ group used.

A preferred form of treating agent used in this invention is an amidosiloxane in which the $R''$ radical is a vinyl radical. When such a treated silica is mixed with a triorganosiloxy endblocked polydiorganosiloxane fluid containing an average of two vinyl radicals per molecule, the resulting silicone elastomer base, when cured, yields cured silicone elastomers of particularly desirable physical properties. The treating agent can have a molecular length represented by a degree of polymerization of from 3 to 20 diorganosiloxane units with the preferred length of from 3 to 6 diorganosiloxane units.

The treating agent can consist of a pure compound or a mixture of compounds. The mixture can be made up of a given compound of the same organo radicals on silicon but of differing molecular length or of a mixture of compounds of differing organo radicals on silicon or combinations of both. A preferred treating agent is a mixture of an amidosiloxane (a) in which R and R' are methyl radicals and $R''$ is vinyl and an amidosiloxane (b) in which R, R', and $R''$ are each methyl. The mole ratio of (a) to (b) can vary from 0.025/1 to 1/1. The preferred amidosiloxanes are those in which x is from 3 to 6.

The mole ratio of (a) to (b) to be used can be determined by simple experiment. Since the physical properties of the cured silicone elastomer are dependent upon the specific polydiorganosiloxane fluid and the cure system chosen by the user, the most desirable ratio will be that which yields the optimum physical properties desired by the user.

The vinyl-containing polydiorganosiloxane fluids used in this invention are well known in the art. The polydiorganosiloxane fluid has an average of two silicon-bonded vinyl radicals per molecule, only one vinyl radical is bonded to any one silicon atom, and the remaining organic radicals can be methyl, ethyl, phenyl, or 2-(perfluoroalkyl)ethyl radicals, in which the perfluoroalkyl radical contains 1 to 4 inclusive carbon atoms, there being from 0 to 50 inclusive percent 2-(perfluoroalkyl)ethyl radicals. The phenyl radicals can be present in an amount from 0 to 30 percent inclusive, all percentages being based on the total number of organic radicals in the polydiorganosiloxane fluid. The polydiorganosiloxane fluid is endblocked by triorganosiloxy groups. The triorganosiloxy groups have organic radicals selected from the same group of organic radicals listed above. The preferred polydiorganosiloxane fluid is endblocked by vinyldiorganosiloxy groups, as illustrated by the formula:

$$(CH_2=CH)R_2^{iv}SiO(R_2^{iv}SiO)_xSiR_2^{iv}(CH=CH_2)$$

where each $R^{iv}$ is a radical as defined above for the organic radicals and x has a value such that the viscosity is from 0.2 Pa.s up to about 100 Pa.s. Mixtures of polydiorganosiloxanes can be used.

The organohydrogen siloxanes containing silicon-bonded hydrogen atoms are also well known in the art such as described by Polmanteer et al. in U.S. Pat. No. 3,697,473 and Lee et al. in U.S. Pat. No. 3,989,668 which patents are hereby incorporated by reference to show examples of organohydrogen siloxanes known in the art. The organohydrogen siloxanes useful in the present invention can be any siloxane having an average of at least 2 silicon-bonded hydrogen atoms per molecule and an average of no more than one silicon-bonded hydrogen atom per silicon atom. The remaining valences of the silicon atoms are satisfied by divalent oxygen atoms or by monovalent hydrocarbon radicals having less than 7 carbon atoms per radical such as methyl, isopropyl, tertiary butyl, and cyclohexyl, and phenyl, and 2-(perfluoroalkyl)ethyl radicals. The organohydrogensiloxanes can be homopolymers, copolymers, and mixtures thereof which contain siloxane units of the following types: $R_2^4SiO$, $R_3^4SiO_{0.5}$, $H(CH_3)SiO$, and $H(CH_3)_2SiO_{0.5}$ where $R^4$ is the monovalent hydrocarbon defined above. Some specific examples include polymethylhydrogensiloxane cyclics, copolymers of trimethylsiloxy and methylhydrogensiloxane units, copolymers of dimethylhydrogensiloxy and methylhydrogen siloxane units, copolymers of trimethylsiloxy, dimethylsiloxane, and methylhydrogensiloxane units, and copolymers of dimethylhydrogensiloxy, dimethylsiloxane, and methylhydrogensiloxane units. Preferably the organohydrogen siloxanes have an average of at least 5 silicon-bonded hydrogen atoms per molecule.

The amount of organohydrogen siloxane used is dependent upon the amount of vinyl radical present in the silicone elastomer base. There should be enough organohydrogen siloxane present to provide from 1.2 to 3 inclusive silicon-bonded hydrogen atoms for each vinyl radical present in the silicone elastomer base. Amounts of organohydrogen siloxane outside of this range result in inferior physical properties in the cured silicone elastomer.

The silicone elastomer bases of this invention can be cured with an organohydrogen siloxane and a catalyst which can be any of the platinum-containing catalysts that are known to catalyze the reaction of silicon-bonded hydrogen atoms with silicon-bonded vinyl groups and which are soluble in polydiorganosiloxane fluid. Platinum containing catalysts which are not soluble in said fluid are not sifficiently effective to cure the silicone elastomer bases. A class of platinum-containing catalysts particularly suitable for use in this invention are the complexes of chloroplatinic acid described by Willing in U.S. Pat. No. 3,419,593 which is hereby incorporated by reference to show the preparation of said complexes and the complexes per se. A preferred catalyst, described by Willing, is a platinum-containing complex which is the reaction product of chloroplatinic acid and sym-divinyltetramethyldisiloxane.

The platinum-containing catalyst is present in an amount sufficient to provide at least one part by weight of platinum for every one million parts by weight of polydiorganosiloxane fluid. It is preferred to use sufficient catalyst so that there is present from 5 to 50 parts by weight of platinum for every one million parts by weight of polydiorganosiloxane fluid. It is to be understood that amounts of platinum greater than 50 parts per million are also effective catalysts, but that these larger amounts are unnecessary and wasteful, especially when the preferred catalyst is used.

A mixture of treated silica, polydiorganosiloxane fluid, organohydrogensiloxane, and platinum catalyst can begin to cure immediately on mixing at room temperature, therefore it is necessary to inhibit the action of the catalyst at room temperature with a platinum catalyst inhibitor if the composition is to be stored before molding.

One type of platinum catalyst inhibitor suitable for use is the acetylenic inhibitors described in U.S. Pat. No. 3,445,420 to Kookootsedes et al. which is hereby incorporated by reference to show the acetylenic inhibitors and their use as inhibitors.

A second type of platinum catalyst inhibitor is the olefinic siloxanes that are described in the U.S. Pat. No. 3,989,667 to Lee and Marko which is hereby incorporated by reference to show the preparation of olefinic siloxanes and their use in silicone compositions as platinum catalyst inhibitors.

A third type of platinum catalyst inhibitor is the vinylorganocyclosiloxanes of the formula

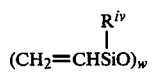

$$(CH_2=CHSiO)_w$$
with $R^{iv}$ above wherein $R^{iv}$ is defined above and w has an average value of from 3 to 6. Vinylorganocyclosiloxanes are well known in the organosilicon art, especially where $R^{iv}$ is methyl and w is 3, 4, or 5.

The amount of platinum catalyst inhibitor that may be used in the curable compositions of this invention is simply the amount needed to produce the desired shelf life and yet not extend the cure time to an impractical level. This amount will vary widely and will depend upon the particular inhibitor that is used, the nature and concentration of the platinum-containing catalyst and the nature of the organohydrogensiloxane.

Inhibitor added in amounts as small as one mole of inhibitor for every mole of platinum will in some instances cause an inhibition of the catalyst and afford a satisfactory pot life. In other cases, considerably more inhibitor, such as 10, 50, 100, 500 and more moles of inhibitor for every mole of platinum may be needed to achieve the desired combination of pot life and cure time. The exact amount of any particular inhibitor to be used in the curable compositions of this invention should be determined by simple experimentation.

The inhibiting effect of platinum catalyst inhibitor can be overcome by heating the curable compositions of this invention to a temperature of 70° C. or higher.

The silicone elastomer bases of this invention can also be cured with the aid of the well known organic peroxide vulcanizaing agents for silicone elastomers. These organoperoxide vulcanizaing agents include benzoylperoxide, parachlorobenzoylperoxide, dicumylperoxide, and 2,4-dichlorobenzoylperoxide. The peroxides such as di-tertiary-butylperoxide, tertiary-butylperbenzoate, and 2,5-bis-(tertiarybutylperoxy)-2,5-dimethylhexane are preferred as they are particularly efficient in causing reactions with the vinyl radical of the polydiorganosiloxane fluid and the vinyl radical of the treating agent on the reinforcing silica. The organic peroxide containing silicone elastomer bases are cured by heating above the activation temperature of the organic peroxide chosen. The time and temperatures necessary are well known in the art.

The amounts of ingredients used in the present invention depend upon the desired properties of the final elastomer. In general, increasing the treated silica content increases the hardness and tensile strength of the cured product. However, the amount of filler used should not be so great that the viscosity of the curable composition becomes too high for practical use in the molding process being used, particularly if the molding process is a low pressure molding system. The curable compositions of the present invention can be formulated so they can be injected into light weight molds under low pressures, such as 600 kPa cyclinder pressure, in a liquid injection molding process.

The curable compositions can be cured very rapidly in a hot mold and removed without cooling the mold in such a liquid injection molding process. The upper viscosity limit of curable composition using predominately reinforcing silica filler is about 160 Pa.s for use in such a process.

The amount of treated silica used is from 5 to 100 parts by weight based upon 100 parts by weight of the polydiorganosiloxane fluid. The preferred range is from 20 to 60 parts.

The curable compositions of this invention can contain other ingredients that are common to the silicone rubber art, such as pigments, extending fillers, antioxidants, compression set additives, and thermal stability additives as long as the desirable properties of said compounds are not compromised thereby.

A silicone elastomer base is produced by mixing a finely divided silica having a surface area of at least 50 square meters per gram and having the surface treated with an amidosiloxane as described in this invention with a triorganosiloxy endblocked polydiorganosiloxane fluid. The method of mixing is not critical as long as the treated silica is completely dispersed in the fluid. Methods well known in the art such as dough type mixers and two roll rubber mills are preferred. If a relatively low viscosity fluid is used it is desirable to mix the treated silica with a portion of the fluid until the silica is dispersed, then add the remainder of the fluid to the mixture. Shear is necessary in order to properly disperse the treated silica in the fluid.

The base is then further processed in manners well known in the art to yield a curable silicone elastomer composition by mixing in the required crosslinking system, and any of the other specialized additives common to the silicone elastomer art.

The order of mixing is not critical; however, with the platinum catalyzed composition, if the composition is not to be used immediately or if the composition is to be used in a method of liquid injection molding, it is preferred to have inhibitor present when base, organohydrogensiloxane and catalyst are mixed, since a curing reaction involving these ingredients begins immediately at room temperature if inhibitor is not present.

Since the organohydrogen siloxane and the inhibitor frequently are volatile or contain volatile compounds it is preferred that said ingredients be mixed after heating and/or vacuum operations in the preparation of the curable compositions have been completed. Processing temperatures above 300° C. are not recommended.

The curable compositions can be cured by heating, preferably to a temperature greater than 70° C., either in a confined area or exposed to the atmosphere. Curing temperatures of greater than 300° C., should be avoided. The curable compositions are useful in any type of molding operation providing the required temperatures and times to produce the cured elastomers are available.

The following examples are presented for illustrative purposes only, and should not be construed as limiting the present invention which is properly delineated in the claims. In the formulas found in the examples, the methyl, and vinyl radicals are represented by Me and Vi respectively. All parts are parts by weight.

EXAMPLE 1

A. A reinforcing silica was treated by a prior art method. In a closed container, 100 parts of silica with a surface area of approximately 250 m$^2$/g was mixed with 5 parts of water, then 20 parts of hexamethyldisilazane was added and the resulting mixture was agitated for 4 hours. The excess hexamethyldisilazane was then removed by heating at 140° C. for 4 hours under vacuum. This is a comparative example outside the scope of the invention.

B. To a flask equipped with a stirrer and addition funnel, there was added 100 g of a reinforcing silica with a surface area of approximately 400 m$^2$/g, the silica having been dried 22 hours at 200° C. The silica was then covered with dry toluene and stirred to form a slurry. An amount of 63.4 g of treating agent of the formula

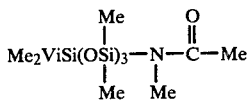

was dripped into the stirring mixture through the addition funnel. After the addition of the treating agent, the resulting mixture was allowed to react while stirring for 20 hours at room temperature. This mixture was then filtered and the filter cake was washed with a 50/50 mixture by volume of isopropyl alcohol and water to remove the amide by-product. The washed filter cake was dried for 4 hours in a vacuum oven at 150° C. with the pressure reduced 99 kPa below atmospheric. The filter cake consisted of treated silica. Analysis showed the treated silica to be hydrophobic, having a void volume of 2.58 cc/g, a carbon content of 7.86 percent by weight and a vinyl radical content of 1.38 percent by weight.

C. The procedure of B was repeated except the alcohol-water washing step was not used. The amide by-product was removed by the drying step.

EXAMPLE 2

A. To a flask equipped with a stirrer and addition funnel, there was added 100 g of a reinforcing silica with a surface area of approximately 250 m$^2$/g, the silica having been dried for 20 hours at 200° C. The silica was then covered with dry toluene and stirred to form a slurry. A treating agent consisting of a mixture was 57.5 g (0.15 mole) of compound of the formula

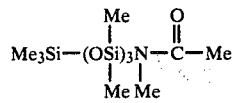

and 5.9 g (0.15 mole) of compound of the formula

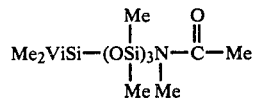

was dripped into the stirring slurry through the addition funnel. After the addition of the treating agent, the resulting mixture was allowed to react while stirring for 20 hours at room temperature. This mixture was then filtered and the filter cake was washed 3 times with a 50/50 by volume mixture if isopropyl alcohol and water to remove the amide by-product. The filter cake was then dried for 4 hours in a vacuum oven at 150° C. with the pressure reduced 99 kPa below atmospheric. The filter cake consisted of treated silica. Analysis showed the treated silica to be hydrophobic, having a void volume of 2.62 cc/g, a carbon content of 7.50 percent by weight and a vinyl radical content of 0.18 percent by weight. The ratio of Vi/C was 0.024 as analyzed (0.023 theory).

B. The procedure of A was reported except the alcohol-water washing step was not used. The amide by-product was removed by the drying step.

EXAMPLE 3

A series of low viscosity, catalysed silicone elastomer bases was prepared by mixing 100 parts of methylphenylvinylsiloxy endblocked polydimethylsiloxane fluid with a viscosity of approximately 30 Pa.s at 25° C., 30 parts of treated silica as indicated in Table I, and 1.3 parts of 2,5 bis(tert-butylperoxy)-2,5-dimethylhexane. The catalyzed silicone elastomer bases were then molded into cured sheets by press curing for 15 minutes at 175° C. Portions of the cured sheets were heat aged as shown in Table I. Physical properties of the cured sheets were measured in accordance with the procedures of ASTM D412 for tensile strength and elongation, with ASTM D624 die B for tear strength and with ASTM D2240 for durometer Shore A. The 100% modulus was determined by measuring the tensile stress at 100% strain. The results were as shown in Table I.

A comparison of the properties obtained by using the prior art treated filler of Example 1A to those properties obtained using the treated fillers of this invention of Examples 1B, 1C, and 2A show that the use of the treated fillers of this invention yield useful products.

TABLE I

| Treated Silica Example | Heat Aging | Durometer | Tensile Strength MPa | Elongation percent | 100% Modulus MPa | Tear Strength kN/m |
|---|---|---|---|---|---|---|
| 1,A* | None | 15 | 5.95 | 1050 | 0.23 | 10.5 |
|  | 24 hr/210° C. | 31 | 8.23 | 762 | 0.50 | 14.2 |
|  | 500hr/210° C. | 43 | 4.99 | 311 | 1.38 | 7.4 |
| 1,B | None | 49 | 4.29 | 403 | 1.20 | 9.5 |

TABLE I-continued

| Treated Silica Example | Heat Aging | Durometer | Tensile Strength MPa | Elongation percent | 100% Modulus MPa | Tear Strength kN/m |
|---|---|---|---|---|---|---|
| | 24 hr/210° C. | 61 | 4.89 | 383 | 1.61 | 15.8 |
| | 500hr/210° C. | 74 | 4.75 | 86 | — | 2.8 |
| 1,C | None | 23 | 5.08 | 723 | 0.45 | 23.3 |
| | 24 hr/210° C. | 41 | 5.46 | 583 | 0.71 | 14.5 |
| | 500hr/210° C. | 58 | 3.95 | 196 | 1.91 | 5.4 |
| 2,A | None | 52 | 6.15 | 487 | 1.46 | 9.8 |
| | 70 hr/210° C. | 64 | 5.41 | 265 | 2.51 | 7.7 |
| | 500hr/210° C. | 76 | 2.94 | 37 | — | 1.8 |

*Comparative Example

EXAMPLE 4

A series of low viscosity, heat-curable, silicone elastomer compositions was prepared by mixing 100 parts of methylphenylvinylsiloxy endblocked polydimethylsiloxane fluid with a viscosity of approximately 30 Pa.s at 25° C., 30 parts of treated silica as indicated in Table II, 0.67 parts of a trimethylsiloxy endblocked polyorganosiloxane crosslinker having an average of 5 methylhydrogensiloxane units and 3 dimethylsiloxane units per molecule, 0.203 parts of a platinum catalyst in the form of a chloroplatinic acid complex with symmetrical divinyltetramethyldisiloxane containing about 0.65 weight percent platinum, and about 0.03 parts of 3,5-dimethyl-1-hexyn-3-ol. These silicone elastomer compositions were molded, cured, and tested according to the procedure of Example 3. The flow rate shown in Table II is the amount of uncured material extruded through a 3.18 mm orifice under 0.62 MPa pressure in one minute. The results were as shown in Table II.

The tensile strength retention, elongation retention and tear srength retention shown in Table II are calculated by dividing the value after heat aging by the value with no heat aging. A result greater than 100% means the actual value after heat aging is greater than the initial value. A value of less than 100% means that the value after heat aging is less than the initial value.

treating agent consisting essentially of an amido-siloxane of the formula

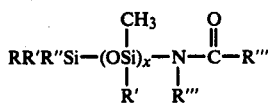

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or vinyl radical; R''' is a methyl or ethyl radical; and x is an integer of from 3 to 20 inclusive.

2. The treated silica according to claim 1 in which the treating agent is a mixture of amidosiloxanes where x has an average value of from greater than 3 to less than 20.

3. The treated silica according to claim 2 in which the mixture of amidosiloxanes consists essentially of
   (a) an amidosiloxane in which R and R' are each methyl, R" is vinyl, and x is 3 to 6 inclusive and
   (b) an amidosiloxane in which R, R', and R" are each methyl and x is 3 to 6 inclusive.

4. The treated silica in accordance with claim 3 in which (a) and (b) are present in a mole ratio of (a) to (b) of from 0.025/1 to 1/1.

TABLE II

| Treated Silica Sample | Heat Aging | Durometer | Tensile Strength MPa | Elongation % | 100% Modulus MPa | Tear Strength kN/m | Flow Rate gm/min |
|---|---|---|---|---|---|---|---|
| | | | Physical Properties | | | | |
| 2,A | None | 22 | 3.48 | 593 | 0.45 | 13.7 | 224 |
| | 24 hr/210° C. | 38 | 5.17 | 639 | 0.67 | 21.7 | |
| | 500hr/210° C. | 42 | 4.37 | 528 | 0.83 | 12.8 | |
| 2,B | None | 38 | 7.58 | 700 | 0.76 | 35.9 | 54.6 |
| | 70 hr/210° C. | 44 | 9.03 | 745 | 0.76 | 30.3 | |
| | 500hr/210° C. | 44 | 7.04 | 617 | 0.96 | 22.8 | |

| Treated Silica Sample | Heat Aging | Durometer Change | Tensile Strength Retention % | Elongation Retention % | Tear Strength Retention % |
|---|---|---|---|---|---|
| | | Effect of Heat Aging | | | |
| 2,A | None | — | — | — | — |
| | 24 hr/210° C. | +16 | 149 | 108 | 158 |
| | 500hr/210° C. | +20 | 126 | 89 | 93 |
| 2,B | None | — | — | — | — |
| | 24 hr/210° C. | +6 | 119 | 106 | 84 |
| | 500hr/210° C. | +6 | 93 | 88 | 64 |

That which is claimed is:

1. A treated silica consisting essentially of a finely divided silica with a surface area of at least 50 square meters per gram, said silica having been mixed with 5. A silicone elastomer base comprising a fluid and treated silica of claim 1, in which there is present 100 parts by weight fluid for each 5 to 100 parts by weight of treated silica, the fluid being a triorganosiloxy endblocked polydiorganosiloxane wherein each organic radical is selected from a group consisting of methyl, ethyl, vinyl, phenyl, and 2-(perfluoroalkyl)ethyl in which the perfluoroalkyl radical contains 1 to 4 inclusive carbon atoms, there being an average of two vinyl radicals per siloxane molecule and one vinyl radical bonded to any one silicon atom, there being from 0 to 50 inclusive percent 2-(perfluoroalkyl)ethyl radicals based on the total number of organic radicals in the siloxane and from 0 to 30 inclusive percent phenyl radicals being based on the total number of organic radicals in the siloxane.

6. A silicone elastomer base comprising a fluid and the treated silica of claim 2, in which there is present 100 parts by weight fluid for each 5 to 100 parts by weight of treated silica, the fluid being a triorganosiloxy end-blocked polydiorganosiloxane wherein each organic radical is selected from a group consisting of methyl, ethyl, vinyl, phenyl, and 2-(perfluoroalkyl)ethyl in which the perfluoroalkyl radical contains 1 to 4 inclusive carbon atoms, there being an average of two vinyl radicals per siloxane molecule and one vinyl radical bonded to any one silicon atom, there being from 0 to 50 inclusive percent 2-(perfluoroalkyl)ethyl radicals based on the total number of organic radicals in the siloxane and from 0 to 30 inclusive percent phenyl radicals being based on the total number of organic radicals in the siloxane.

7. A silicone elastomer base comprising a fluid and the treated silica of claim 3, in which there is present 100 parts by weight of fluid for each 5 to 100 parts by weight of treated silica, the fluid being a triorganosiloxy endblocked polydiorganosiloxane wherein each organic radical is selected from a group consisting of methyl, ethyl, vinyl, phenyl, and 2-(perfluoroalkyl)ethyl in which the perfluoroalkyl radical contains 1 to 4 inclusive carbon atoms, there being an average of two vinyl radicals per siloxane molecule and one vinyl radical bonded to any one silicon atom, there being from 0 to 50 inclusive percent 2-(perfluoroalkyl)ethyl radicals based on the total number or organic radicals in the siloxane and from 0 to 30 inclusive percent phenyl radicals being based on the total number of organic radicals in the siloxane.

8. A silicone elastomer base comprising a fluid and the treated silica of claim 4, in which there is present 100 parts by weight fluid for each 5 to 100 parts by weight of treated silica, the fluid being a triorganosiloxy end-blocked polydiorganosiloxane wherein each organic radical is selected from a group consisting of methyl, ethyl, vinyl, phenyl, and 2-(perfluoroalkyl)ethyl in which the perfluoroalkyl radical contains 1 to 4 inclusive carbon atoms, there being an average of two vinyl radicals per siloxane molecule and one vinyl radical bonded to any one silicon atom, there being from 0 to 50 inclusive percent 2-(perfluoroalkyl)ethyl radicals based on the total number of organic radicals in the siloxane and from 0 to 30 inclusive percent phenyl radicals being based on the total number of organic radicals in the siloxane.

9. A composition comprising a product obtained from mixing the silicone elastomer base of claim 5, an organohydrogen siloxane, and a platinum catalyst; the organohydrogen siloxane having an average of at least 2 silicon-bonded hydrogen atoms per molecule consisting essentially of units selected from a group consisting of $H(CH_3)SiO$ units, $R_2^4SiO$ units, $H(CH_3)_2SiO_{0.5}$ units, and $R_3^4SiO_{0.5}$ units wherein each $R^4$ is a monovalent hydrocarbon radical having less than 7 carbon atoms per radical, the organohydrogen siloxane being present in an amount sufficient to provide from 1.2 to 3 inclusive silicon-bonded hydrogen atoms for each vinyl group in silicone elastomer base; and the platinum catalyst being soluble in the fluid of the silicone elastomer base and being present in an amount sufficient to provide at least 1 part by weight of platinum per one million parts by weight of fluid.

10. A composition comprising a product obtained from mixing the silicone elastomer base of claim 6, an organohydrogen siloxane, and a platinum catlayst; the organohydrogen siloxane having an average of at least 2.1 silicon-bonded hydrogen atoms per molecule, and consisting essentially of units selected from a group consisting of $H(CH_3)SiO$ units, $R_2^4SiO$ units, $H(CH_3)_2SiO_{0.5}$ units, and $R_3^4SiO_{0.5}$ units wherein each $R^4$ is a monovalent hydrocarbon radical having less than 7 carbon atoms per radical, the organohydrogen siloxane being present in an amount sufficient to provide from 1.2 to 3 inclusive silicon-bonded hydrogen atoms for each vinyl group in the silicone elastomer base; and the platinum catalyst being soluble in the fluid of the silicone elastomer base and being present in an amount sufficient to provide at least 1 part by weight of platinum per one million parts by weight of fluid.

11. A composition comprising a product obtained from mixing the silicone elastomer base of claim 7, an organohydrogen siloxane, and a platinum catalyst; the organohydrogen siloxane having an average of at least 2.1 silicon-bonded hydrogen atoms per molecule, and consisting essentially of units selected from a group consisting of $H(CH_3)SiO$ units, $R_2^4SiO$ units, $H(CH_3)_2SiO_{0.5}$ units, and $R_3^4SiO_{0.5}$ units, wherein each $R^4$ is a monovalent hydrocarbon radical having less than 7 carbon atoms per radical, the organohydrogen siloxane being present in an amount sufficient to provide from 1.2 to 3 inclusive silicon-bonded hydrogen atoms for each vinyl group in the silicone elastomer base; and the platinum catalyst being soluble in the fluid of the silicone elastomer base and being present in an amount sufficient to provide at least 1 part by weight of platinum per one million parts by weight of fluid.

12. A composition comprising a product obtained from mixing the silicone elastomer base of claim 8, an organohydrogen siloxane, and a platinum catalyst; the organohydrogen siloxane having an average of at least 2.1 silicon-bonded hydrogen atoms per molecule, and consisting essentially of units selected from a group consisting of $H(CH_3)SiO$ units, $R_2^4SiO$ units, $H(CH_3)_2SiO_{0.5}$ units, and $R_3^4SiO_{0.5}$ units wherein each $R^4$ is a monovalent hydrocarbon radical having less than 7 carbon atoms per radical, the organohydrogen siloxane being present in an amount sufficient to provide from 1.2 to 3 inclusive silicon-bonded hydrogen atoms for each vinyl group in the silicone elastomer base; and the platinum catalyst being soluble in the fluid of the silicone elastomer base and being present in an amount sufficient to provide at least 1 part by weight of platinum per one million parts by weight of fluid.

13. The silicone elastomer base according to claim 5 in which there is also present an organic peroxide vulcanizing agent suitable for vulcanizing silicone rubber.

14. The silicone elastomer base according to claim 6 in which there is also present an organic peroxide vulcanizing agent suitable for vulcanizing silicone rubber.

15. The silicone elastomer base according to claim 7 in which there is also present an organic peroxide vulcanizing agent suitable for vulcanizing silicone rubber.

16. The silicone elastomer base according to claim 8 in which there is also present an organic peroxide vulcanizing agent suitable for vulcanizing silicone rubber.

17. A process comprising mixing a finely divided silica with a surface area of at least 50 square meters per gram with treating agent consisting essentially of an amidosiloxane of the formula

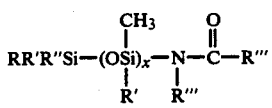

where R is a methyl, ethyl, or phenyl radical, R' is a methyl, ethyl, or 2-(perfluoroalkyl)ethyl radical in which the perfluoroalkyl radical contains 1 to 4 inclusive carbon atoms; R" is a methyl or vinyl radical; R'" is a methyl or ethyl radical; and x is an integer of from 3 to 20 inclusive, and removing the amide by-product to yield a treated silica.

18. The process according to claim 17 in which the treating agent is a mixture of amidosiloxanes where x has an average value of from greater than 3 to less than 20, the mixing step is carried out in a non-polar organic solvent, thereafter recovering the treated silica by filtration, removing the amide by-product from the treated silica by washing with a solvent for the amide, and drying the treated silica.

19. The process according to claim 18 in which the mixtue of amidosiloxanes consists essentially of
   (a) An amidosiloxane in which R and R' are each methyl, R" is vinyl, and x is 3 to 6 inclusive and
   (b) An amidosiloxane in which R, R', and R" are each methyl and x is 3 to 6 inclusive.

20. The process according to claim 19 in which (a) and (b) are present in a mole ratio fo (a) to (b ) of from 0.025/1 to 1/1.

21. The process according to claim 17 in which the treating agent is a mixture of amidosiloxanes where x has an average value of from greater than 3 to less than 20, the mixing step is carried out in a non-polar organic solvent, thereafter recovering the treated silica by filtration, and removing the amide by-product from the treated silica by drying the treated silica at a temperature above the boiling point of the amide by-product.

22. The process according to claim 21 in which the mixtue of amidosiloxanes consists essentially of
   (a) an amidosiloxane in which R and R' are each methyl, R" is vinyl, x is 3 to 6 inclusive, and
   (b) an amidosiloxane in which R, R', and R" are each methyl and x is 3 to 6 inclusive.

23. The process according to claim 22 in which (a) and (b) are present in a mole ratio of (a) to (b) of from 0.025/1 to 1/1.

24. The cured silicone elastomer of claim 9.
25. The cured silicone elastomer of claim 10.
26. The cured silicone elastomer of claim 11.
27. The cured silicone elastomer of claim 12.

28. A cured silicone elastomer obtained from heating the composition of claim 13 above the activation temperature of the organic peroxide.

29. A cured silicone elastomer obtained from heating the composition of claim 14 above the activation temperature of the organic peroxide.

30. A cured silicone elastomer obtained from heating the composition of claim 15 above the activation temperature of the organic peroxide.

31. A cured silicone elastomer obtained from heating the composition of claim 16 above the activation temperature of the organic peroxide.

* * * * *

UNITED STATES PATENT AND TRADEMARK OFFICE
CERTIFICATE OF CORRECTION

PATENT NO. : 4,173,560
DATED : November 6, 1979
INVENTOR(S) : G. R. Homan, M. T. Maxson, L. H. Toporcer It is certified that error appears in the above-identified patent and that said Letters Patent is hereby corrected as shown below:

Column 8, line 34, the word "reported" should read --repeated--.
Column 14, line 13, the word "mixtue" should read --mixture--.

Signed and Sealed this

Thirtieth Day of November 1982

[SEAL]

Attest:

GERALD J. MOSSINGHOFF

Attesting Officer

Commissioner of Patents and Trademarks